United States Patent
Pyun et al.

(10) Patent No.: US 9,333,951 B2
(45) Date of Patent: May 10, 2016

(54) ANTI-FREEZING APPARATUS AND ANTI-FREEZING METHOD USING THE SAME

(71) Applicant: KCW Corporation, Daegu (KR)

(72) Inventors: Gi Jae Pyun, Daegu (KR); Jae Seo Lee, Daegu (KR)

(73) Assignee: KCW CORPORATION (KR)

( * ) Notice: Subject to any disclaimer, the term of this patent is extended or adjusted under 35 U.S.C. 154(b) by 0 days.

(21) Appl. No.: 14/487,945

(22) Filed: Sep. 16, 2014

(65) Prior Publication Data

US 2015/0076242 A1    Mar. 19, 2015

(30) Foreign Application Priority Data

Sep. 17, 2013  (KR) .................. 10-2013-0111905

(51) Int. Cl.
| | | |
|---|---|---|
| *B60S 1/46* | (2006.01) | |
| *B60S 1/48* | (2006.01) | |
| *B05B 1/10* | (2006.01) | |
| *B05B 1/24* | (2006.01) | |
| *B05B 17/04* | (2006.01) | |

(52) U.S. Cl.
CPC . *B60S 1/487* (2013.01); *B60S 1/485* (2013.01)

(58) Field of Classification Search
CPC .......... B60S 1/485; B60S 1/486; B60S 1/487; B60S 1/488; B60S 1/56
See application file for complete search history.

(56) References Cited

U.S. PATENT DOCUMENTS

| 6,237,861 B1* | 5/2001 | Northrop ................ B60S 1/481 239/1 |
|---|---|---|
| 2002/0134857 A1* | 9/2002 | Zimmer .................. B60S 1/488 239/284.1 |
| 2014/0217194 A1* | 8/2014 | Han ........................ B60S 1/488 239/1 |

FOREIGN PATENT DOCUMENTS

| JP | 05286416 | 11/1993 |
|---|---|---|
| JP | 2007055562 | 3/2007 |
| KR | 20100036518 | 4/2010 |

* cited by examiner

*Primary Examiner* — Darren W Gorman
(74) *Attorney, Agent, or Firm* — The Belles Group, P.C.

(57) ABSTRACT

An anti-freezing apparatus and an anti-freezing method using the same are provided. The anti-freezing apparatus includes: a nozzle which sprays anti-freezing liquid to a wind shield; a storage container which stores the anti-freezing liquid; a pump which delivers the anti-freezing liquid stored in the storage container to the nozzle; and a controller which controls the driving of the pump in a stop state and allows the anti-freezing liquid to be sprayed through the nozzle.

16 Claims, 9 Drawing Sheets

ANTI-FREEZING APPARATUS AND ANTI-FREEZING METHOD USING THE SAME

CROSS REFERENCE TO RELATED APPLICATIONS

Priority is claimed under 35 U.S.C. §119 to Korean Patent Application No.: 10-2013-0111905, filed Sep. 17, 2013, the disclosure of which is incorporated herein by reference in its entirety.

FIELD OF THE INVENTION

This embodiment relates to an anti-freezing apparatus and an anti-freezing method using the same.

BACKGROUND OF THE INVENTION

In general, when a vehicle is parked or left for a long time with the rapid fall of the outside temperature, water vapor in the atmosphere may be frozen and the windows of the vehicle may be frozen. Also, when the outside temperature falls rapidly after snowing, the snow covering on the windows may be frozen. Here, if the frozen water vapor or the accumulated snow is left for a long time without being immediately removed, the water vapor or snow is completely frozen and is difficult to remove, so that there is a difficulty in driving the vehicle again.

It is possible to melt the frozen water vapor or the accumulated snow by using heat. However, in the use of heat, the engine of the vehicle idles, and thus, unnecessary fuel consumption may occur. Also, if the outside temperature is very low in the use of the heat of the engine, it takes a long time to melt the frozen water vapor or the accumulated snow. Thus, it is very difficult to remove the frozen water vapor or the accumulated snow.

Therefore, there is a requirement for an apparatus capable of removing the frozen water vapor or the accumulated snow on the windows of the vehicle without the idling of the engine, even if the vehicle is parked or left for a long time with the rapid fall of the outside temperature after the driving of the vehicle is completed.

Further, other transporting means such as ships, aircrafts, etc., as well as the vehicle also require an anti-freezing apparatus capable of cope with the rapid fall of the outside temperature.

SUMMARY OF THE INVENTION

An embodiment is an anti-freezing apparatus that includes: a nozzle which sprays anti-freezing liquid to a wind shield; a storage container which stores the anti-freezing liquid; a pump which delivers the anti-freezing, liquid stored in the storage container to the nozzle; and a controller which controls the driving of the pump in a stop state and allows the anti-freezing liquid to be sprayed through the nozzle.

Another embodiment is a transporting means to which the anti-freezing apparatus is applied.

Further another embodiment is an anti-freezing method for preventing a wind shield of a vehicle from being frozen in a stop state. The anti-freezing, method includes: receiving a sensing signal based on information on the outside conditions or a turn-on signal of an operation switch; generating an operation control signal in response to the sensing signal or the turn-on signal; and spraying anti-freezing liquid through a nozzle by operating a pump in response to the operation control signal.

DETAILED DESCRIPTION OF THE INVENTION

The following detailed description of the present invention shows a specified embodiment of the present invention and will be provided with reference to the accompanying drawings. The embodiment will be described in enough detail that those skilled in the art are able to embody the present invention. It should be understood that various embodiments of the present invention are different from each other and need not be mutually exclusive. For example, a specific shape, structure and properties, which are described in this disclosure, may be implemented in other embodiments without departing from the spirit and scope of the present invention with respect to one embodiment. Also, it should be noted that positions or placements of individual components within each disclosed embodiment may be changed without departing from the spirit and scope of the present invention. Therefore, the following detailed description is not intended to be limited. If adequately described, the scope of the present invention is limited only by the appended claims of the present invention as well as all equivalents thereto. Similar reference numerals in the drawings designate the same or similar functions in many aspects.

An embodiment of the present invention will be described in detail with reference to the accompanying drawings. In the components of the present invention, detailed descriptions of what can be clearly understood and easily carried into practice through a prior art by those skilled in the art will be omitted to avoid making the subject matter of the present invention unclear.

Figure 1:
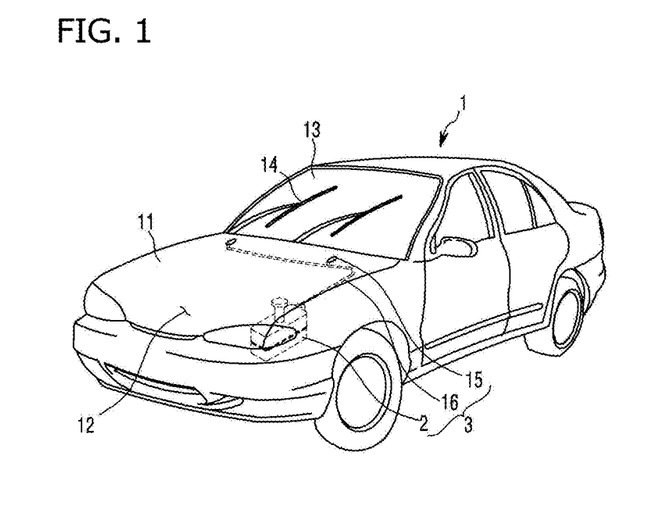
FIG. 1 is a conceptual view showing a vehicle to which an anti-freezing apparatus according to an embodiment of the present invention has been adapted.

FIG. 1 is a conceptual view showing a vehicle to which an anti-freezing apparatus according to an embodiment of the present invention has been adapted.

Referring to FIG. 1, with regard to a general front wheel drive vehicle 1, an engine room 12 is located within a hood 11 located in the front part of the vehicle 1. An anti-freezing apparatus 3 is disposed in the engine room 12. The anti-freezing apparatus 3 may include a nozzle 15 which sprays anti-freezing liquid to a wind shield 13 of the vehicle 1, a storage container 2 which stores the anti-freezing liquid, and a tube 16 which connects the storage container 2 with the nozzle 15. When the anti-freezing apparatus 3 sprays the anti-freezing liquid stored in the storage container 2 to the wind shield through the use of the nozzle 15, a freezing point of water vapor or snow decreases. Therefore, even though the outside temperature falls rapidly, the water vapor or snow may not be completely frozen on the wind shield. Accordingly, even when the vehicle 1 is exposed to the outside for a long time, e.g., is parked or left, the frozen water vapor or accumulated snow can be easily removed by a wiper 14.

In the embodiment, a container for storing windshield wash can be used as the storage container 2, and the windshield wash can be used as the anti-freezing liquid. However, there is no limit to this.

Although it is shown that the anti-freezing apparatus is installed in the vehicle, the anti-freezing apparatus can be also used in other transporting means such as ships, aircrafts, etc., without being limited to this.

Figure 2:
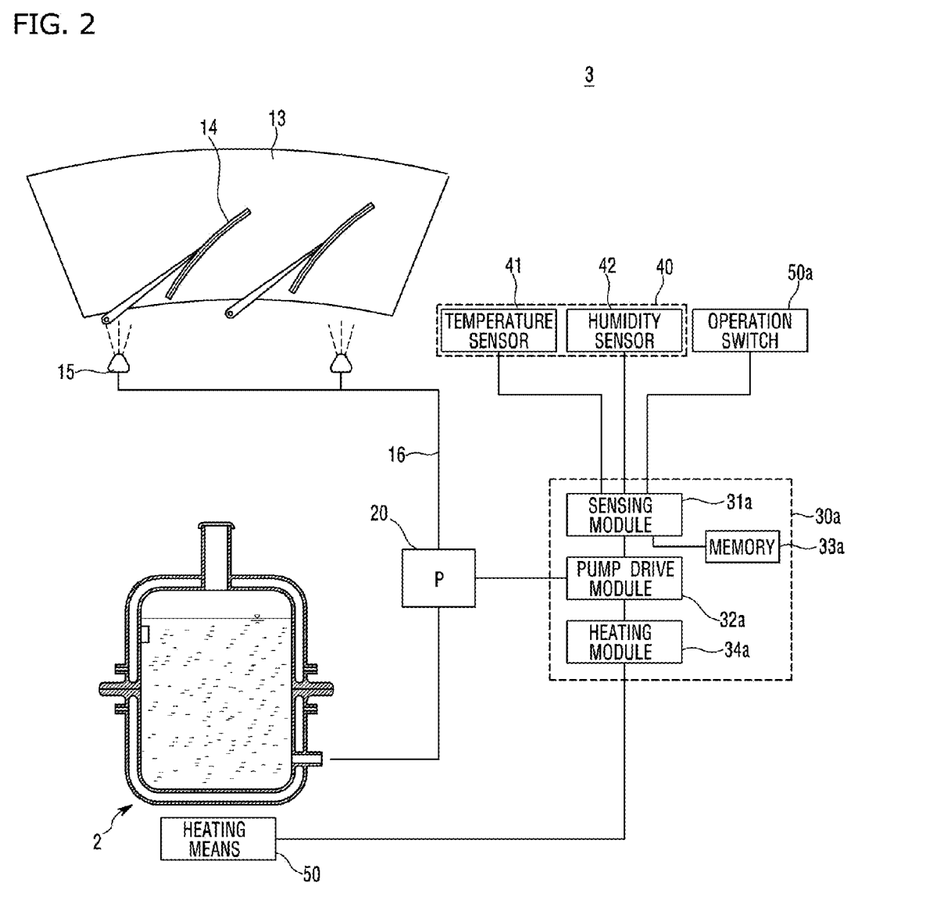
FIG. 2 is a structure view showing an example of the anti-freezing apparatus shown in FIG. 1.

FIG. 2 is a structure view showing an example of the anti-freezing apparatus shown in FIG. 1.

Referring to FIG. 2, the anti-freezing apparatus 3 may include the nozzle 15 which sprays the anti-freezing liquid to the wind shield 13 of the vehicle, the storage container 2 which stores the anti-freezing liquid, a pump 20 which delivers the anti-freezing liquid stored in the storage container 2 to the nozzle 15, and a controller 30a which controls the driving of the pump 20 being operated in a stop state and allows the anti-freezing liquid to be sprayed through the nozzle 15.

The nozzle 15 receives the anti-freezing liquid stored in the storage container 2 through the tube 16 by driving the pump 20 and sprays. The anti-freezing apparatus 3 installed in the vehicle may spray the anti-freezing liquid to the wind shield 13 of the vehicle. The storage container 2 may store the anti-freezing liquid. Liquid having a freezing point lower than that of water, for example, alcohol, etc., can be used as the anti-freezing liquid. Also, a windshield wash storage container can be used as the storage container 2.

In the case where the windshield wash storage container is used as the storage container 2 for the anti-freezing liquid, the windshield wash can be used as the anti-freezing liquid. Also since there is no need to install separate equipment, it is possible to reduce the manufacturing cost of a transporting means such as the vehicle, ship, aircraft and the like.

Under the control of the controller 30a, the pump 20 delivers the anti-freezing liquid stored in the storage container 2 to the nozzle 15 through the tube 16 and sprays. The spray point of time, spray interval, spray amount, the number of spraying per hour, spray intensity, etc., of the anti-freezing liquid which is sprayed from the nozzle 15 may be determined depending on the operation of the pump 20. In the embodiment, the spray point of time, spray interval, spray amount, the number of spraying, per hour, spray intensity, etc., of the anti-freezing liquid may be determined by using a predetermined algorithm.

The controller 30a may allow the anti-freezing liquid to be sprayed to the wind shield through the nozzle 15 by controlling the pump 20. The controller 30a may determine the spray point of time, spray interval, spray amount, the number of spraying per hour, spray intensity, etc., of the anti-freezing, liquid by using information on the outside temperature and/or humidity and may control the driving of the pump 20. Also, the controller 30a allows a user of the vehicle to freely operate the anti-freezing apparatus 3 by means of a predetermined method regardless of the outside temperature and/or humidity, so that the spray point of time, spray interval, spray amount, the number of spraying per hour, spray intensity, etc., of the anti-freezing liquid stored in the storage container 2 can be determined by the predetermined method.

In the embodiment, the controller 30a may drive the pump 20 by using a predetermined algorithm. The predetermined algorithm may drive the pump 20 by using the outside temperature and/or humidity or may drive the pump 20 by a predetermined method without using the outside temperature and/or humidity. Further, in the case where the predetermined algorithm drives the pump 20 by no use of the outside temperature and/or humidity, the user is able to determine the method of driving the pump 20 and to drive the pump 20.

In the embodiment, the anti-freezing apparatus 3 may further include a sensor 40. The sensor 40 is able to identify the outside temperature information and/or outside humidity information, etc. The sensor 40 may transfer a sensing signal generated based on information on the outside conditions of the vehicle, for example, the outside temperature information and/or outside humidity information, etc., to the controller 30a.

In the embodiment, the sensor 40 may include at least one of a temperature sensor 41 capable of measuring the outside temperature and a humidity sensor 42 capable of measuring the outside humidity.

In the embodiment, the anti-freezing apparatus 3 may further include an operation switch 50a. When the user causes the operation switch 50a to be turned on in parking or leaving the vehicle outside, the controller 30a may allow the anti-freezing liquid to be sprayed by using a turn-on signal according to the turn-on of the operation switch 50a instead of using the sensing signal. In accordance with the turn-on signal, the predetermined algorithm may allow the anti-freezing liquid to be periodically or non-periodically sprayed through the nozzle 15 by the predetermined method. Also, the user may control the turn-on/turn-off of the operation switch 50a in the driver's seat of the vehicle. The turn-on signal may include a first turn-on signal and a second turn-on signal. The user determines the outside temperature and/or humidity and operates the operation switch 50a, so that one of the first and the second turn-on signals is output. The spray amount, the number of spraying, spray point of time, spray intensity, etc., of the anti-freezing liquid may be changed according to the first and the second turn-on signals.

In the embodiment, the controller 30a may include a sensing module 31a and a pump drive module 32a. The sensing module 31a may receive the sensing signal from the sensor 40. Also, the sensing module 31a is connected to a memory 33a having the predetermined algorithm stored therein. The sensing module 31a may generate an operation control signal for controlling the driving of the pump 20 by applying the sensing signal to the predetermined algorithm and output the operation control signal to the pump drive module 32a. The pump driving module 32a may receive the operation control signal and control the driving of the pump 20. Also, the sensing module 31a may receive the turn-on signal from the operation switch 50a. The sensing module 31a may generate an operation control signal for controlling the driving of the pump 20 by applying the turn-on signal to the predetermined algorithm and may output the operation control signal to the pump driving module 32a. The pump driving module 32a may receive the operation control signal and control the driving of the pump 20. Here, the operation control signal may include information on at least one of the spray point of time, spray interval, spray amount, the number of spraying per hour, spray intensity, etc., of the anti-freezing liquid.

In the embodiment, the controller 30a may further include a heating module 34a. A heating means 50 may be disposed to the storage container 2. The heating means 50 is operated by the control of the heating module 34a and the anti-freezing liquid stored in the storage container 2 may be heated. The heated anti-freezing liquid makes it easier to melt the frozen water vapor or accumulated snow on the wind shield. An electric coil, waste heat emitted from the engine, and a separately provided internal combustion engine can be taken as an example of the heating means 50. However, the heating means 50 is not limited to these. The electric coil may receive and convert electricity from a battery into heat energy and may heat the storage container. The storage container 2 may be heated by using waste heat emitted from the engine. Also, the storage container 2 may be heated by means of heat generated by the internal combustion engine. Also, the sensing module 31a may generate an operation control signal for controlling the driving of the heating means 50 and output to the heating module 34a. The heating module 34a may receive the operation control signal and control the driving of the heating means 50.

Figure 3:
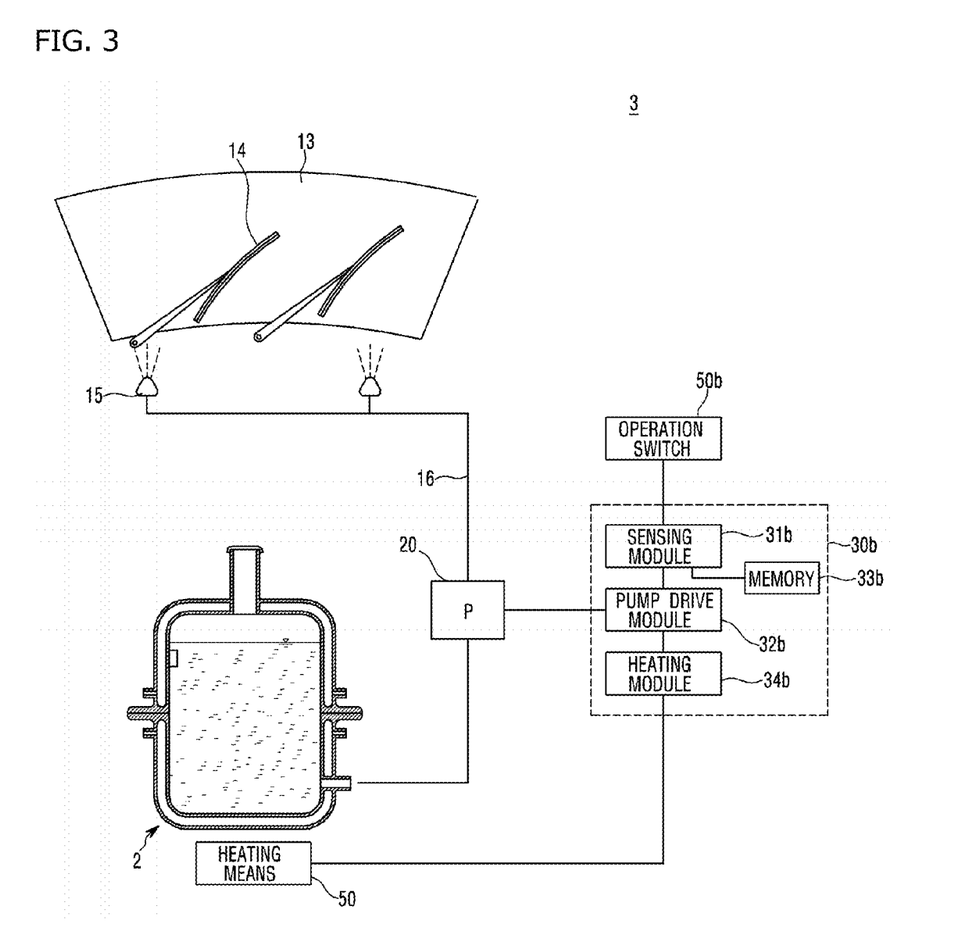
FIG. 3 is a structure view showing another example of the anti-freezing apparatus shown in FIG. 1.

FIG. 3 is a structure view showing another example of the anti-freezing, apparatus shown in FIG. 1. Referring to FIG. 3, the anti-freezing apparatus 3 may include the nozzle 15 which sprays the anti-freezing liquid to the wind shield of the vehicle, the storage container 2 which stores the anti-freezing liquid, the pump 20 which delivers the anti-freezing liquid stored in the storage container 2 to the nozzle 15, and the controller 30b which receives the turn-on signal from an operation switch 50b outputting the turn-on signal and controls the driving of the pump 20 in a stop state, so that the anti-freezing liquid is sprayed through the nozzle 15.

The nozzle 15 receives the anti-freezing liquid stored in the storage container 2 through the tube 16 by driving the pump 20 and sprays. The anti-freezing apparatus 3 installed in the vehicle may spray the anti-freezing liquid to the wind shield 13 of the vehicle. The storage container 2 may store the anti-freezing liquid. Liquid having a freezing point lower than that of water, for example, alcohol, etc., can be used as the anti-freezing liquid. Also, a windshield wash storage container can be used as the storage container 2. In the case where the windshield wash storage container is used as the storage container 2 for the anti-freezing liquid, the windshield wash can be used as the anti-freezing liquid.

The operation switch 50b enables the user to freely operate the anti-freezing apparatus 3. When the user causes the operation switch 50b to be turned on in parking or leaving the vehicle outside, the turn-on signal can be output. Unless the operation switch 50b outputs the turn-on signal, the anti-freezing apparatus 3 may not operate. The turn-on signal may include a first turn-on signal and a second turn-on signal. When the operation switch 50b outputs the first turn-on signal, a pump driving module 32b may operate in a first mode, and when the operation switch 50b outputs the second turn-on signal, the pump driving module 32b may operate in a second mode. For example, when the outside temperature is not expected to fall below minus 10 degrees Celsius, the user allows the first turn-on signal to be generated by operating the operation switch 50b, so that the anti-freezing apparatus 3 may operate in the first mode. When the outside temperature is expected to fall below minus 10 degrees Celsius, the User allows the second turn-on signal to be generated by operating the operation switch 50b, so that the anti-freezing apparatus 3 may operate in the second mode. Here, the set temperature and the number of the modes are only for description, without being limited to this.

Under the control of the controller 30b, the pump 20 delivers the anti-freezing liquid stored in the storage container 2 to the nozzle 15 through the tube 16 and sprays. The spray point of time, spray interval, spray amount, the number of spraying per hour, spray intensity, etc., of the anti-freezing liquid which is sprayed from the nozzle 15 may be determined depending on the operation of the pump 20. In the embodiment, the spray point of time, spray interval, spray amount, the number of spraying per hour, spray intensity, etc., of the anti-freezing liquid may be determined by using a predetermined algorithm.

The controller 30b may allow the anti-freezing liquid to be sprayed to the wind shield through the nozzle 15 by controlling the pump 20. The controller 30b allows the user of the vehicle to freely operate the anti-freezing apparatus 3 regardless of the outside temperature and/or humidity, thereby causing the anti-freezing liquid stored in the storage container 2 to be supplied to the nozzle 15 through the tube 16.

When the pump 20 is operated according to the operation control signal, the controller 30b allows the anti-freezing liquid stored in the storage container 2 to be supplied to the nozzle 15 through the tube 16. The predetermined algorithm may determine the spray point of time, spray interval, spray amount, the number of spraying per hour, spray intensity, etc., of the anti-freezing liquid in accordance with the turn-on signal which is transmitted from the operation switch 50b.

In the embodiment, the controller 30b may include a sensing module 31b and the pump drive module 32b. The sensing module 31b may receive the turn-on signal from the operation switch 50b. The sensing module 31b may generate the operation control signal controlling the driving of the pump 20 by applying the turn-on signal to the predetermined algorithm and may output the operation control signal to the pump drive module 32b. The turn-on signal may be divided into a first turn-on signal and a second turn-on signal.

Here, the operation control signal may include the information on at least one of the spray point of time, spray interval, spray amount, the number of spraying per hour, spray intensity, etc., of the anti-freezing, liquid.

The sensing module 31b may be connected to a memory 33b having the predetermined algorithm stored therein. The sensing module 31b may generate an operation control signal for controlling the driving of the pump 20 by applying the turn-on signal to the predetermined algorithm and may output the operation control signal to the pump driving module 32a. The predetermined algorithm stored in the memory 33b may set a mode in which the anti-freezing apparatus 3 operates in accordance with the detected turn-on signal, and then may determine the spray characteristics of the anti-freezing liquid, depending on the set mode. That is, when the user expects how much the temperature falls and generates the turn-on signal in response to the expected temperature by means of the operation switch 50b, the sensing module 31b may generate and output the operation control signal by performing the predetermined algorithm according to the turn-on signal. Generally, when the user determines that the temperature falls much, it is possible to intend to more spray the anti-freezing liquid than when the user does not determine that the temperature falls much. The spray amount of the anti-freezing liquid can be controlled by the number of spraying per hour, spray time period, spray intensity, etc.

In the embodiment, the controller 30b may further include a heating module 34b. The heating means 50 may be disposed to the storage container 2. The heating means 50 is operated by the control of the heating module 34b and the anti-freezing liquid stored in the storage container 2 may be heated. The heated anti-freezing liquid makes it easier to melt the frozen water vapor or accumulated snow. An electric coil, waste heat emitted from the engine, and a separately provided internal combustion engine can be taken as an example of the heating means 50. The electric coil may receive and convert electricity from a battery into heat energy and may heat the storage container. The storage container 2 may be heated by using waste heat emitted from the engine. Also, the storage container 2 may be heated by means of the internal combustion engine generating heat. The sensing module 31*a* may generate an operation control signal for controlling the driving of the heating means 50 and output to the heating module 34*a*. The heating module 34*a* may receive the operation control signal and control the driving of the heating means 50. However, there is no limit to this.

Figure 4:
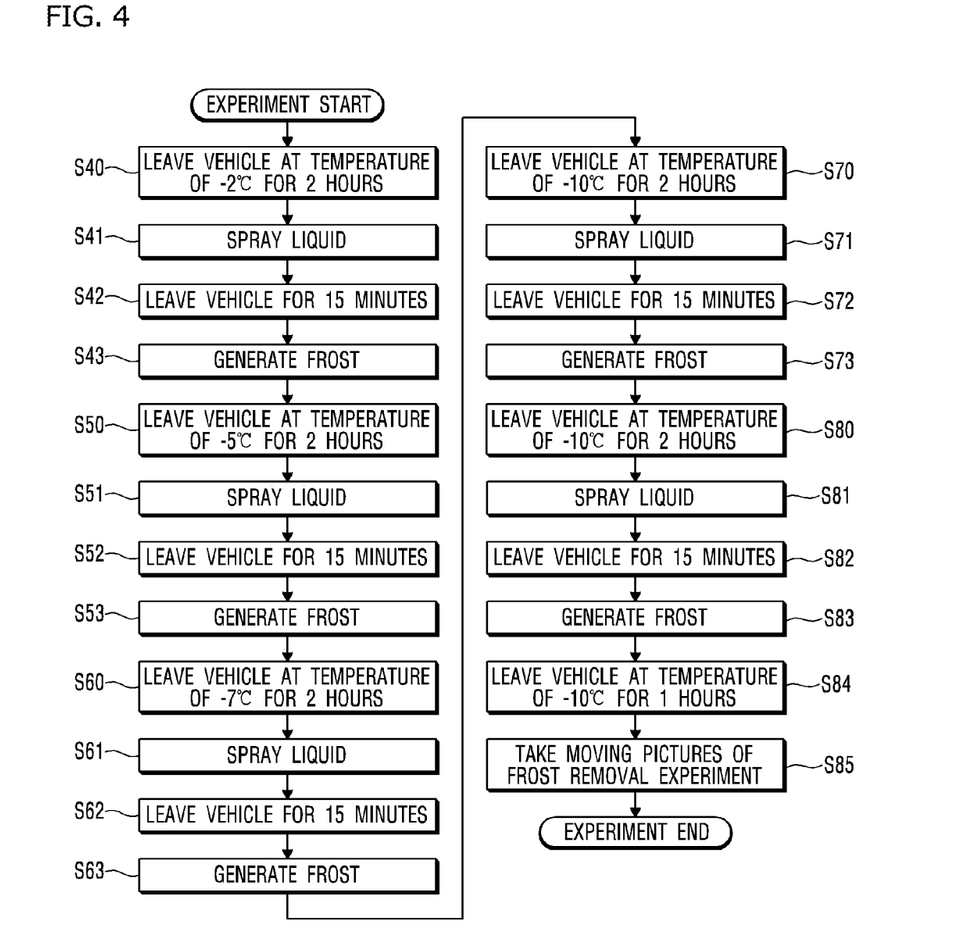
FIG. 4 is a flowchart showing a simulation process of forming frost on the window of the vehicle.

FIG. 4 is a flowchart showing a simulation process of forming frost on the window of the vehicle.

Referring to FIG. 4, it is intended that frost formed by repeating several steps has a plurality of layers in order that the thick frost is formed on the wind shield. First, the vehicle is left at the temperature of minus 2 degrees Celsius for 2 hours (S40). After the vehicle is left for 2 hours, the anti-freezing liquid and/or windshield wash is sprayed on the wind shield of the vehicle (S41). Then, the vehicle is left again at the temperature of minus 2 degrees Celsius for 15 minutes (S42), and water is sprayed on the vehicle, so that the frost is formed on the wind shield (S43).

Then, the vehicle is left at the temperature of minus 5 degrees Celsius for 2 hours (S50). After that, the anti-freezing liquid and/or windshield wash is sprayed again on the wind shield on which the frost has been fixated (S51), and the vehicle is left at the temperature of minus 5 degrees Celsius for 15 minutes (S52). Then, water is sprayed on the vehicle, so that the frost is formed again on the first formed frost (S53).

Then, the vehicle is left at the temperature of minus 7 degrees Celsius for 2 hours (S60). After that, the anti-freezing liquid and/or windshield wash is sprayed on the wind shield of the vehicle (S61). Then, the vehicle is left at the temperature of minus 7 degrees Celsius for 15 minutes (S62), and water is sprayed on the vehicle, so that the frost is formed (S63).

Then, the vehicle is left at the temperature of minus 10 degrees Celsius for 2 hours (S70). After that, the anti-freezing liquid and/or windshield wash is sprayed on the wind shield of the vehicle (S71). Then, the vehicle is left at the temperature of minus 7 degrees Celsius for 15 minutes (S72), and water is sprayed on the vehicle, so that the frost is formed (S73).

Then, the vehicle is left at the temperature of minus 10 degrees Celsius for 2 hours (S80). After that, the anti-freezing liquid and/or windshield wash is sprayed on the wind shield of the vehicle (S81). Then, the vehicle is left at the temperature of minus 10 degrees Celsius for 15 minutes (S82), and water is sprayed on the vehicle, so that the frost is formed (S83).

Then, the vehicle is left at the temperature of minus 10 degrees Celsius for 1 hour (S84). After that, a frost removal experiment is performed (S85). The frost removal experiment is performed by spraying the anti-freezing liquid and/or windshield wash on the frost formed on the wind shield one to four times and by removing the frost through use of the wiper. About 30 cc of the anti-freezing liquid and/or windshield wash is sprayed on the wind shield of the vehicle for each of the above temperatures. Additionally, with the intention of forming the frost on the wind shield, about 1 liter of water is sprayed for each temperature.

Figure 5A:
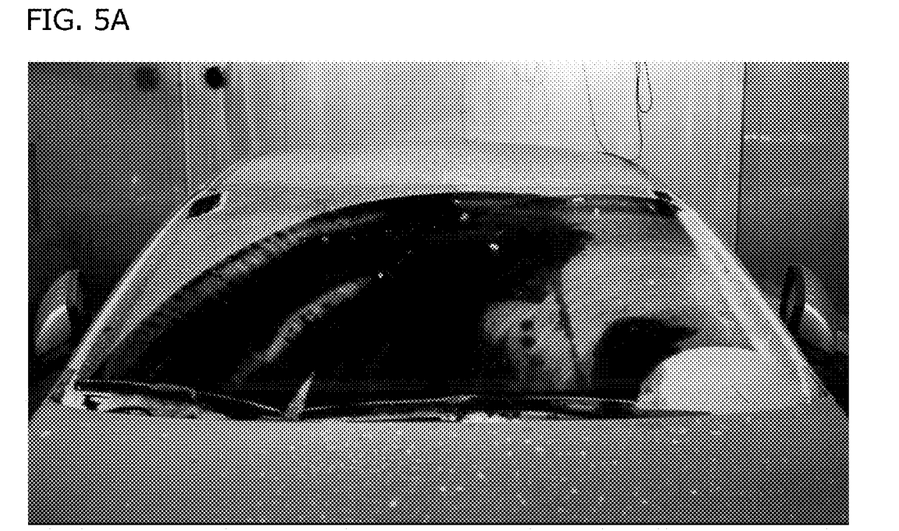
FIGS. 5A to 5D are views showing a simulation result of ejecting anti-freezing liquid.
Figure 5B:
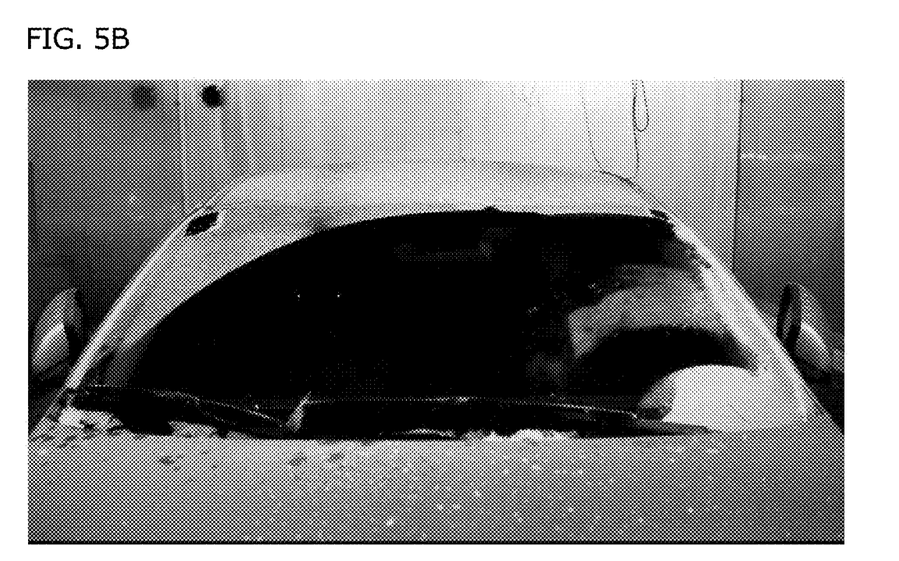
Figure 5C:
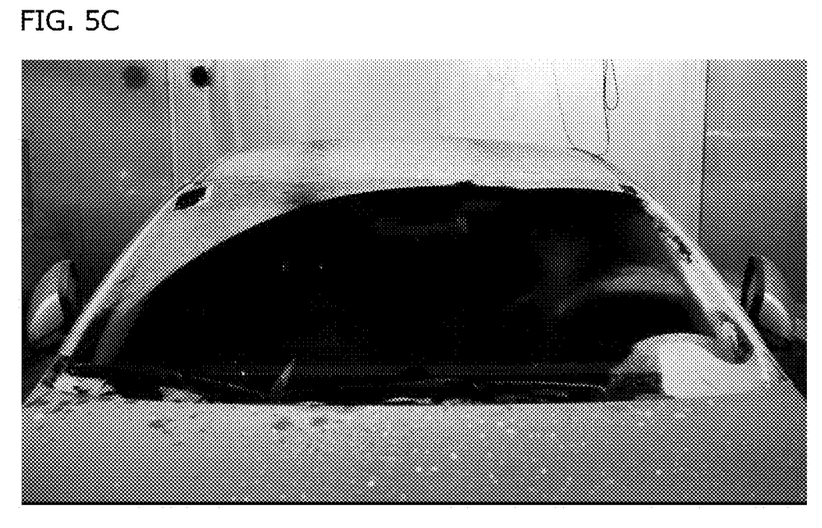
Figure 5D:
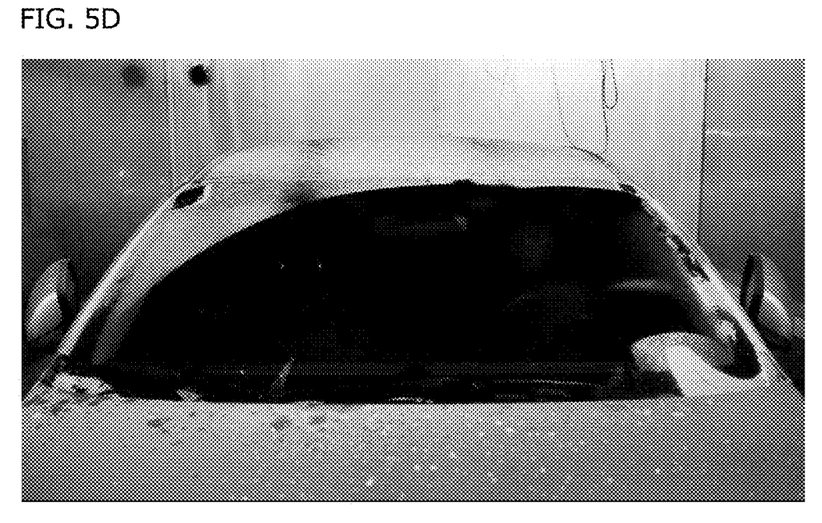
Figure 6A:
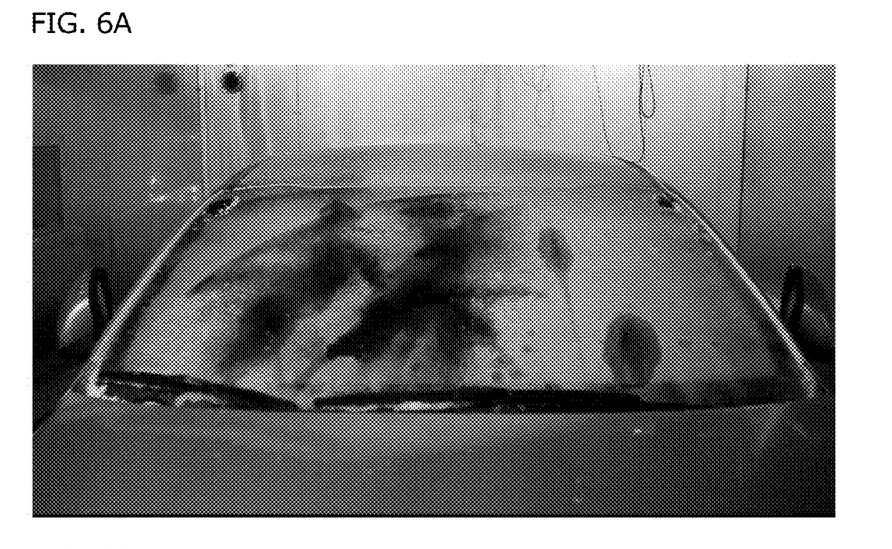
FIGS. 6A to 6D are views showing a simulation result of ejecting washer liquid.
Figure 6B:
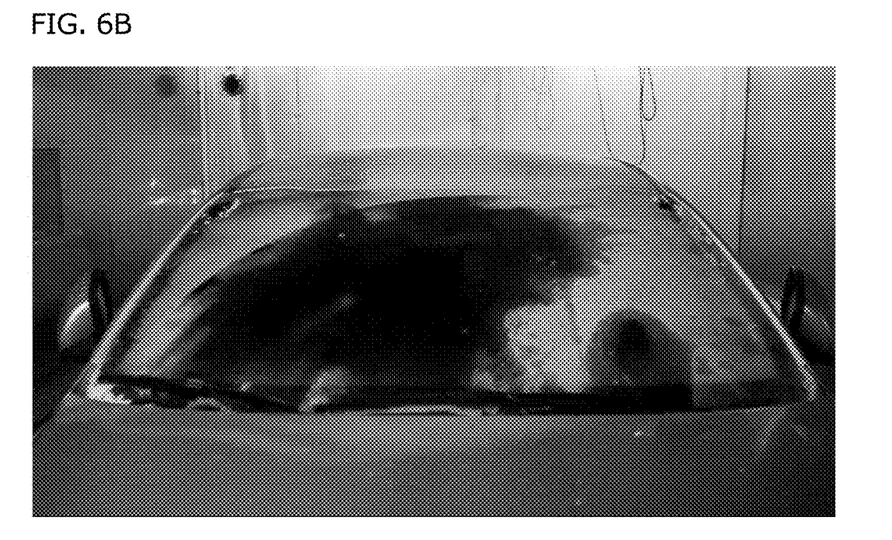
Figure 6C:
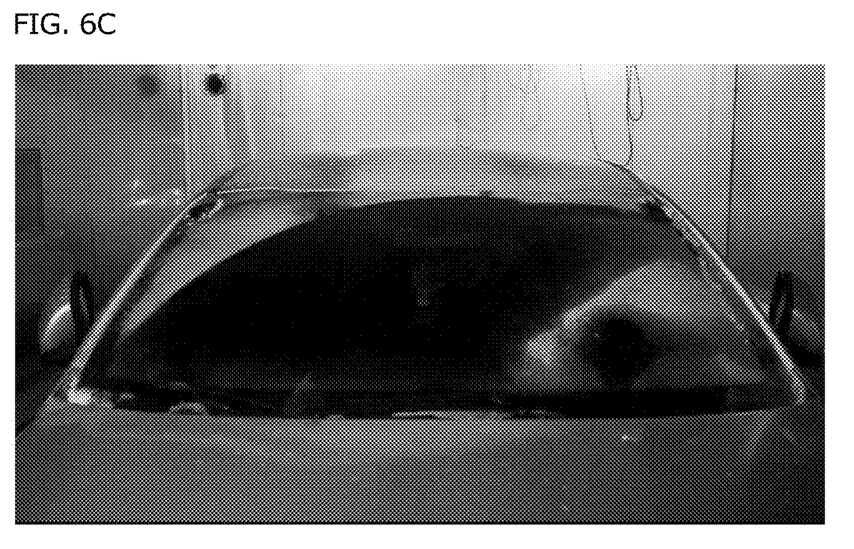
Figure 6D:
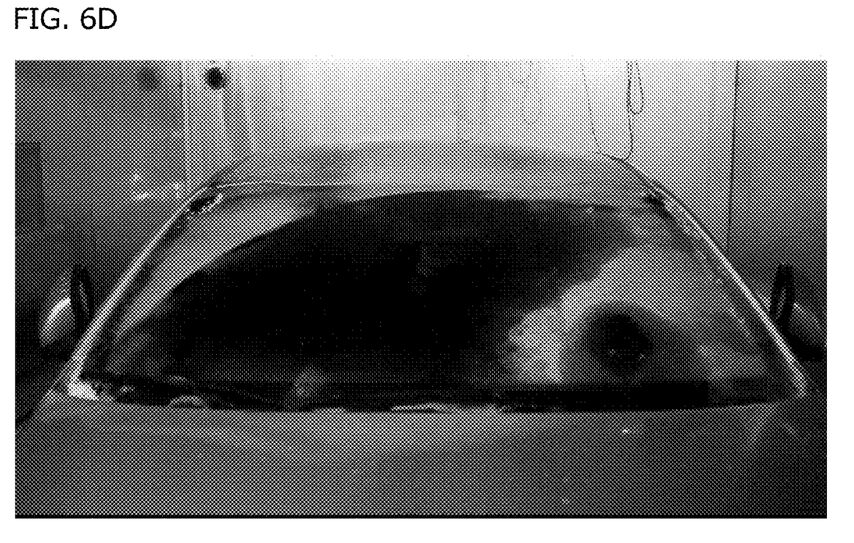

FIG. 5A shows that after the anti-freezing liquid is sprayed one time, the frost has been removed by the wiper. FIG. 5B shows that after the anti-freezing liquid is sprayed twice, the frost has been removed by the wiper. FIG. 5C shows that after the anti-freezing liquid is sprayed three times, the frost has been removed by the wiper. FIG. 5D shows that after the anti-freezing liquid is sprayed four times, the frost has been removed by the wiper. FIG. 6A shows that after the windshield wash is sprayed one time, the frost has been removed by the wiper. FIG. 6B shows that after the windshield wash is sprayed twice, the frost has been removed by the wiper. FIG. 6C shows that after the windshield wash is sprayed three times, the frost has been removed by the wiper. FIG. 6D shows that after the windshield wash is sprayed four times, the frost has been removed by the wiper. Here, the sprayed anti-freezing liquid or windshield wash is heated by a heating apparatus.

Referring to FIGS. 5A to 5D, when the anti-freezing liquid is sprayed on the left vehicle at least twice, the frost can be easily removed by the wiper. Also, referring to FIGS. 6A to 6D, when the windshield wash is sprayed on the left vehicle at least three times, the frost can be easily removed by the wiper. In other words, it is possible to easily remove the frost formed on the wind shield within a short period of time.

Figure 7:
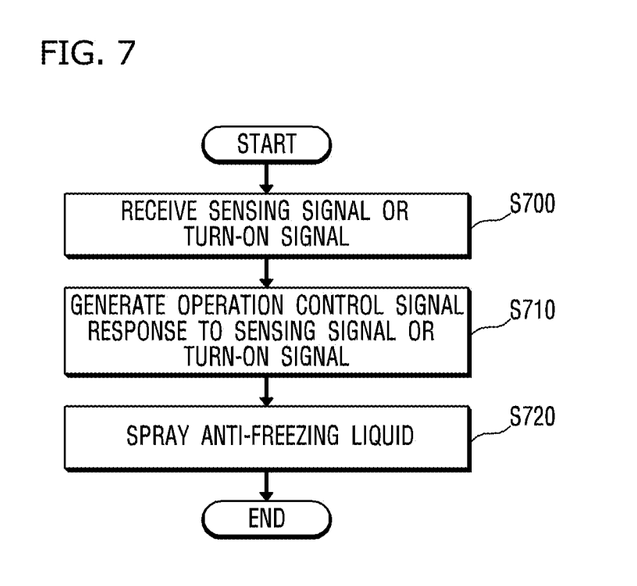
FIG. 7 is a flowchart showing a process of preventing freezing by using the anti-freezing apparatus according to the embodiment of the present invention.

FIG. 7 is a flowchart showing an anti-freezing method using the anti-freezing apparatus according to the embodiment of the present invention.

Referring to FIG. 7, in the anti-freezing method which prevents the wind shield of the vehicle from being frozen in a stop state, the anti-freezing apparatus may receive the sensing signal or the turn-on signal (S700). The sensor may measure information on the outside conditions of the vehicle, for example, the outside temperature information and/or outside humidity information, etc., and may generate the sensing signal based on the measured information on the outside conditions. In the embodiment, the sensor may include at least one of the temperature sensor measuring the outside temperature and the humidity sensor measuring the outside humidity. The operation switch may generate the turn-on signal. The user determines the outside temperature or humidity by himself/herself and operates the anti-freezing apparatus through the operation switch. Therefore, the controller may the sensing signal based on the information on the outside conditions or the turn-on signal of the operation switch. Also, when the operation switch is turned on, the spray amount, the number of spraying, spray intensity, etc., of the anti-freezing liquid may be determined by using the turn-on signal of the operation switch instead of the sensing signal received from the sensor. Further, when the operation switch is turned on, the anti-freezing apparatus may operate, and when the operation switch is not turned on, the anti-freezing apparatus may not operate.

Also, the operation control signal may be generated in response to the sensing signal or the turn-on signal (S710). The operation control signal may include the information on at least one of the spray point of time, spray interval, spray amount, the number of spraying per hour, spray intensity, etc., of the anti-freezing liquid. The operation control signal may determine the spray characteristics of the anti-freezing liquid by using the predetermined algorithm. The predetermined algorithm may generate the operation control signal in response to information on at least one of the outside temperature and outside humidity included in the sensing signal or the turn-on signal of the operation switch.

Also, the pump is operated in response to the operation control signal, so that the anti-freezing liquid can be sprayed through the nozzle (S720). After the anti-freezing liquid is sprayed, the sensing signal or the turn-on signal is received again with the predetermined lapse of time. In response to the received result, it is possible to determine whether or not to operate the pump.

In the embodiment, the anti-freezing liquid may be heated and sprayed.

Also, after the operation of the anti-freezing apparatus is stopped, the pump may be operated with the predetermined lapse of time.

The features, structures and effects and the like described in the embodiments are included in at least one embodiment of the present invention and are not necessarily limited to one embodiment. Furthermore, the features, structures, effects and the like provided in each embodiment can be combined or modified in other embodiments by those skilled in the art to which the embodiments belong. Therefore, contents related to the combination and modification should be construed to be included in the scope of the present invention.

Although the embodiments of the present invention were described above, these are just examples and do not limit the present invention. Further, the present invention may be changed and modified in various ways, without departing from the essential features of the present invention, by those skilled in the art. That is, the components described in detail in the embodiments of the present invention may be modified. Further, differences due to the modification and application should be construed as being included in the scope and spirit of the present invention, which is described in the accompanying claims.

What is claimed is:

1. An anti-freezing apparatus comprising:
   a nozzle which sprays anti-freezing liquid to a wind shield;
   a storage container which stores the anti-freezing liquid;
   a pump which delivers the anti-freezing liquid stored in the storage container to the nozzle;
   a controller which controls the driving of the pump in a stop state of a vehicle and allows the anti-freezing liquid to be sprayed through the nozzle;
   an operation switch which generates a turn-on signal and transmits the turn-on signal to the controller,
      wherein the controller controls the driving of the pump by using the turn-on signal
      wherein the turn-on signal comprises a first turn-on signal and a second turn-on signal,
      wherein at least one of a spray point of time, spray interval, spray amount, the number of spraying per hour, spray intensity of the anti-freezing liquid of the first turn-on signal is different from that of the second turn-on signal, and
      wherein the anti-freezing apparatus operates in one of a first mode, corresponding to the first turn-on signal, and a second mode, corresponding to the second turn-on signal, according to the operation of the operation switch by a user.

2. The anti-freezing apparatus of claim 1, further comprises a sensor which generates a sensing signal and transmits the sensing signal to the controller, wherein the controller controls the driving of the pump by using the sensing signal,
   wherein the controller controls the driving of the pump by using the turn-on signal when the operation switch is turned on, and controls the driving of the pump by using the sensing signal when the operation switch is turned off.

3. The anti-freezing apparatus of claim 2, wherein the sensor comprises at least one of a temperature sensor and a humidity sensor, and wherein the sensing signal is generated based on the information on outside conditions, measured by at least one of the temperature sensor and the humidity sensor.

4. The anti-freezing apparatus of claim 2, wherein the controller further comprises a pump drive module which drives the pump and a sensing module which generates an operation control signal controlling the operation of the pump drive module in response to the sensing signal and outputs the operation control signal to the pump drive module.

5. The anti-freezing apparatus of claim 4, wherein the sensing module generates the operation control signal in response to the sensing signal, and wherein the operation control signal comprises information on at least one of a spray point of time, spray interval, spray amount, the number of spraying per hour, spray intensity of the anti-freezing liquid.

6. The anti-freezing apparatus of claim 2, further comprising a heating means heating the storage container, wherein the anti-freezing liquid stored in the storage container is heated by the heating means, and then is sprayed through the nozzle.

7. The anti-freezing apparatus of claim 6, wherein the controller further comprises:
   a pump drive module which drives the pump,
   a heating module which controls the heating means, and
   a sensing module,
      wherein the sensing module generates an operation control signal controlling the operations of the pump drive module in response to the sensing signal and outputs the operation control signal to the pump drive module, and generates an operation control signal controlling the operations of the heating module in response to the sensing signal and outputs the operation control signal to the heating module.

8. The anti-freezing apparatus of claim 1, wherein the controller further comprises a pump drive module which drives the pump and a sensing module which outputs an operation control signal controlling the operation of the pump drive module in response to the turn-on signal to the pump drive module.

9. The anti-freezing apparatus of claim 8, wherein the sensing module generates the operation control signal in response to the turn-on signal, and wherein the operation control signal comprises information on at least one of a spray point of time, spray interval, spray amount, the number of spraying per hour, spray intensity of the anti-freezing liquid.

10. The anti-freezing apparatus of claim 1, further comprising a heating means heating the storage container, wherein the anti-freezing liquid stored in the storage container is heated by the heating means, and then is sprayed through the nozzle.

11. The anti-freezing apparatus of claim 10, wherein the controller further comprises:
    a pump drive module which drives the pump,
    a heating module which controls the heating means, and
    a sensing module,
       wherein the sensing module generates an operation control signal controlling the operations of the pump drive module in response to the turn-on signal and outputs the operation control signal to the pump drive module, and generates an operation control signal controlling the operations of the pump drive module and the heating module in response to the turn-on signal and outputs the operation control signal to the heating module.

12. A transporting means to which the anti-freezing apparatus of claim 1 is applied.

13. An anti-freezing method for preventing a wind shield of a vehicle from being frozen in the stop state of the vehicle using the anti-freezing apparatus of claim 1, the method comprising:
    receiving the turn-on signal of the operation switch;
    generating an operation control signal in response to the turn-on signal; and
    spraying the anti-freezing liquid through the nozzle by operating the pump in response to the operation control signal.

14. The anti-freezing method of claim 13, further comprising:

receiving a sensing signal based on information on outside conditions, wherein the generating the operation control signal in response to the turn-on signal occurs when the operation switch is turned on, and wherein an operation control signal is generated in response to the sensing signal when the operation switch is turned off, and wherein the sensing signal is generated based on at least one of outside temperature information and outside humidity information.

15. The anti-freezing method of claim 14, wherein the operation control signals comprise information on at least one of a spray point of time, spray interval, spray amount, the number of spraying per hour, spray intensity of the anti-freezing liquid.

16. The anti-freezing method of claim 13, further comprising heating the anti-freezing liquid.

\* \* \* \* \*